Patented Apr. 12, 1938

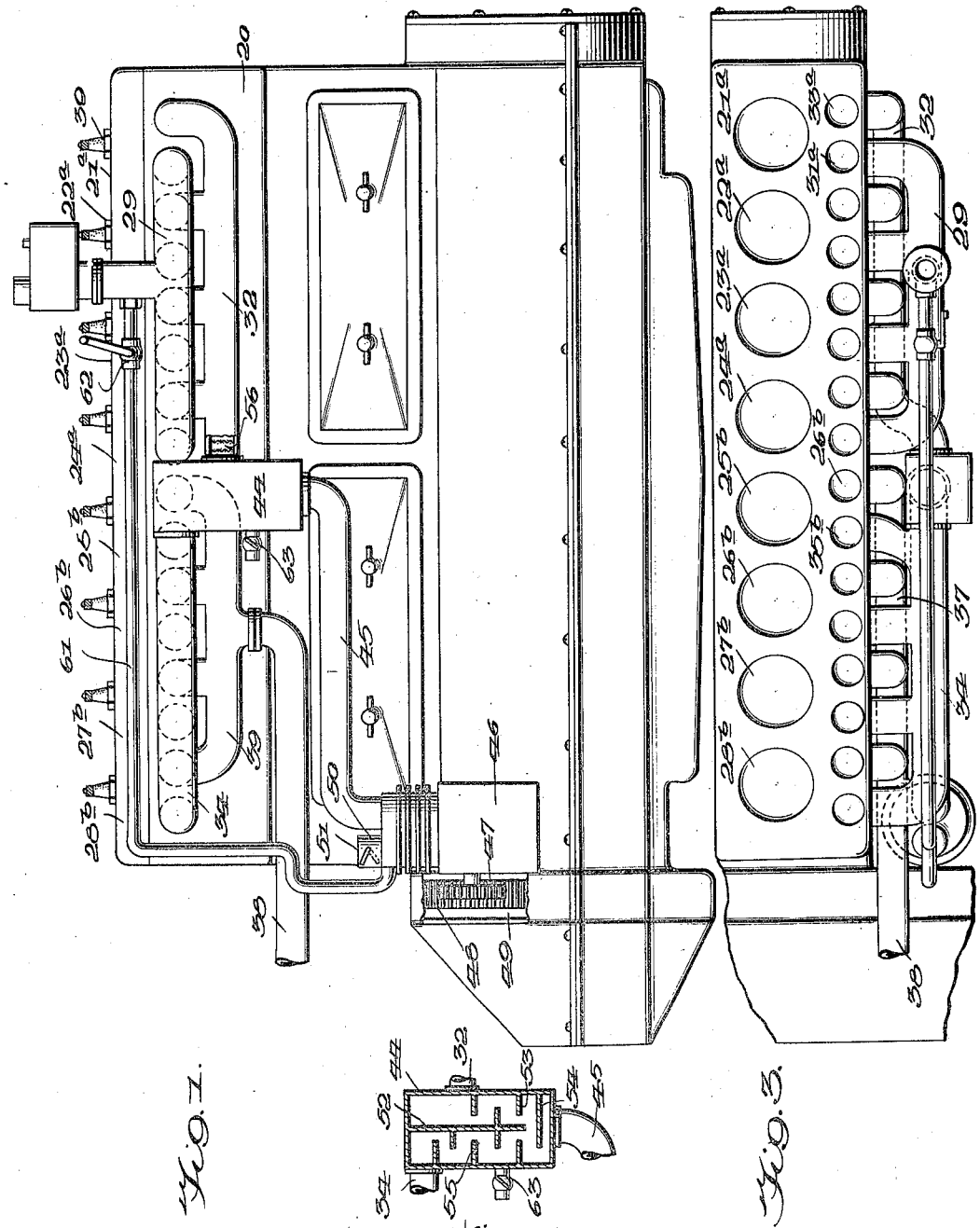

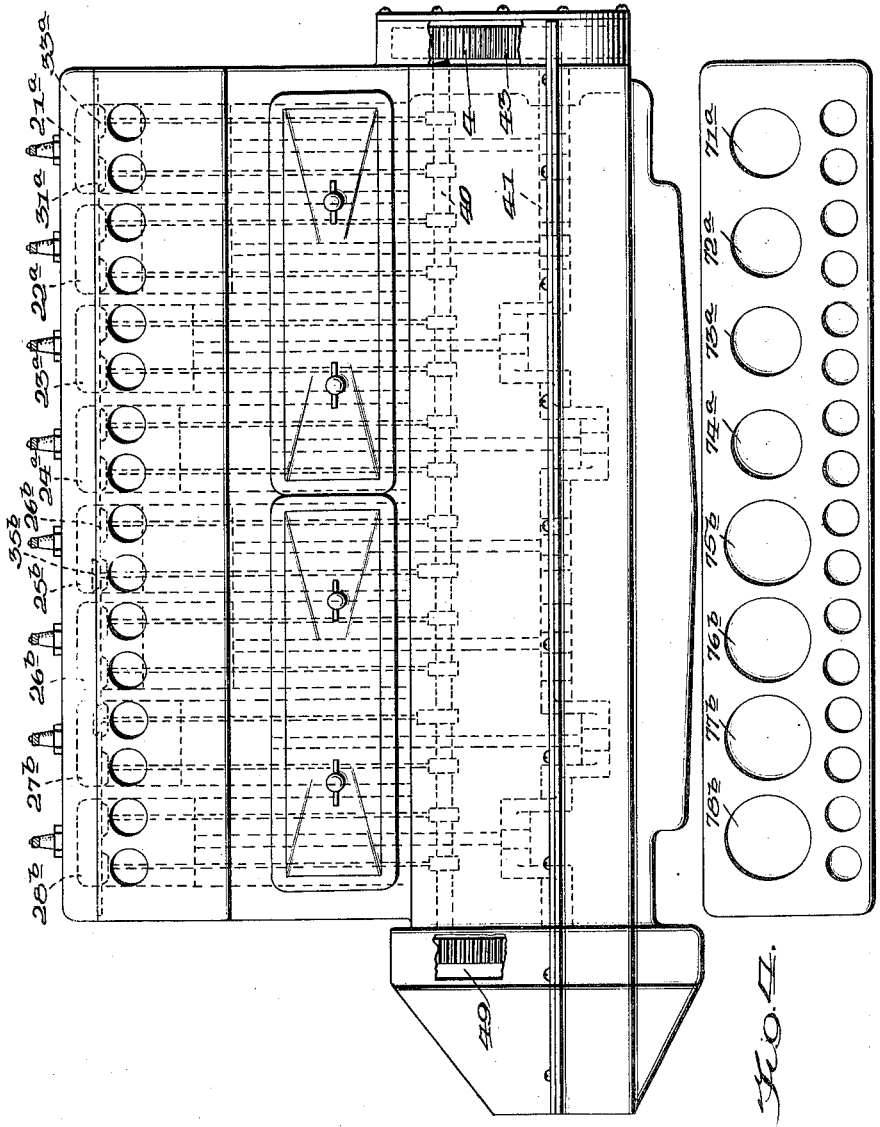
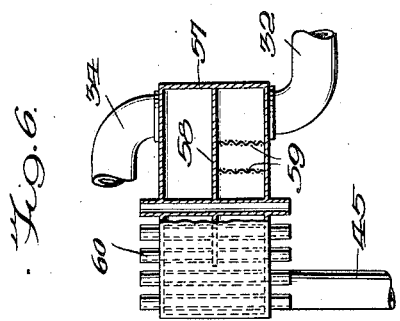

2,113,602

UNITED STATES PATENT OFFICE 2,113,602

INTERNAL COMBUSTION ENGINE

Nathaniel P. Pratt, Atlanta, Ga.

Application July 10, 1933, Serial No. 679,782

23 Claims. (Cl. 123—1)

This invention relates to internal combustion engines, and has as its object the development of greater power and the more efficient and economical use of fuel whereby all of the combustible values in the fuel are completely consumed in the engine and enter into the production of power.

In conventional internal combustion engines charges of fresh fuel are supplied successively to all of the combustion cylinders for the production of power, which means that a quantity of fresh fuel is necessary to the production of power in every cylinder, and by reason of the relatively low efficiency of combustion engines and their known inability to use all the available energy in the fuel in the production of power, the fuel consumption is relatively high and the operation of the engines costly.

According to the present invention only a portion of the cylinders of an engine utilize charges of fresh fuel for their explosive power impulses, but at the same time the remaining engine cylinders produce explosive power impulses. The explosive charges for the latter cylinders are obtained from the products of combustion of the first cylinders. The exhaust gases discharged from the first cylinders, which I will designate as the primary cylinders, instead of passing into the atmosphere are collected and treated to provide a new explosive mixture which is then passed to and exploded in the other, or secondary, cylinders. By this arrangement each portion of fuel initially introduced into the engine is made to yield two explosive power impulses by successive and distinct explosion in one cylinder and then another. The fuel consumption is reduced approximately by a half since each initial fuel charge introduced—or, more properly, the fuel charge and the products of combustion of the fuel charge,—produce explosive power impulses in a plurality instead of a single cylinder of an engine.

In my co-pending application Serial No. 658,986, filed February 28th, 1933, I have disclosed a method of utilizing fuel in engines, the essence of which involves the operation of combustion engine cylinders by explosion of the exhaust gases resulting from the combustion of fuel in other engine cylinders. The present invention is particularly directed to an engine construction adapted to carry out such method, and also to show how the existing engines may be readily modified for the same purpose.

The engine constituting one embodiment of the present invention will hereafter be described in detail in connection with the accompanying drawings wherein:

Fig. 1 is a view in longitudinal elevation of a conventional line engine with the present invention applied thereto;

Fig. 2 is a view of the engine shown in Fig. 1 with the intake and exhaust manifolds of the present invention removed and showing more or less diagrammatically the valves, crank shaft and other interior operating parts;

Fig. 3 is a top view of the engine shown in Fig. 1 with the cylinder head removed;

Fig. 4 is a view corresponding to Fig. 3 showing a modified construction wherein different groups of cylinders have different displacements;

Fig. 5 is a sectional elevation of one of the parts of the engine shown in Fig. 1; and, Fig. 6 is a view partially in section and partially in elevation showing a device which may be substituted for the construction of Fig. 5.

In accordance with the method described in the above identified application, cylinders including those utilizing the exhaust gases as the source of their charge operate conventionally on the four-cycle principle, each to draw in, compress, explode, and finally discharge its particular charge. The prior application points out that the products of combustion, or exhaust, from engine cylinders which operate on fresh fuel charges, as from a carburetor, contain substantial quantities of combustible constituents in addition to inert gases in the form of carbon monoxide, hydrogen and methane. The actual quantity of these combustible constituents will depend upon the richness or leanness of the air fuel mixture supplied to the cylinders, but it has been found that the original air fuel mixture may be proportioned to produce substantial quantities of combustibles in the exhaust without perceptibly decreasing the power developed by the explosion of the fuel charge. Assuming that a relatively rich fuel mixture is used wherein the fuel and air are in the proportions of 1:9 by weight the completeness of combustion is only 50% and the exhaust gases will contain 21.7% combustibles. If the air fuel mixture is made even richer there may be some loss of power in the explosion developed although greater quantities of combustibles will be derived in the exhaust. The mixture may be made somewhat leaner, say perhaps up to a ratio of 1:12 or 1:14 as sufficient proportions of combustibles will be yielded into the exhaust as are capable of explosion under suitable conditions.

It is further pointed out in the prior application that the combustible constituents present in the exhaust may be utilized as the basis of a charge suitable for re-explosion by mixing the same with air or oxygen in proportions determined by the quantities of combustibles present, precautions being taken to extinguish any flame present in the exhaust gases and reduce their temperature below the point of spontaneous combustion prior to admixture with the air. These various operations are taken care of in the engine now to be described.

An engine incorporating the features and operating as above generally described may include any desired number of cylinders arranged in any desired relation. Each cylinder will operate conventionally according to the four-cycle principle of operation. It will be understood that all of the cylinders and their operating parts need not necessarily be altered from conventional construction in order to utilize the invention. On the other hand, the invention involves essentially a re-arrangement and division in the auxiliary parts of the engine which supply fuel to and discharge the expended gases from the various cylinders. In order that these points may be fully appreciated and also to make clear how the invention may be applied to present day engines I have in the drawings, reference being had in particular to Figs. 1, 2, and 3, illustrated a line type engine 20, the same having any desired number of cylinders, eight in number being disclosed. While all of the cylinders and the valve mechanism therefor operate conventionally and in accordance with any desired firing order, only a part of the cylinders will utilize fresh fuel. I have as a matter of convenience selected the first four cylinders 21a, 22a, 23a, and 24a as the primary cylinders, the remaining cylinders 25b, 26b, 27b, and 28b being intended to utilize as their explosive charge a mixture formed from the exhaust gases of the primary cylinders after the gases have been treated to put them in explosive condition. Depending perhaps on the firing order for the various cylinders, it may in some cases be desirable to agroup the primary and secondary cylinders differently from what has just been suggested. The various primary cylinders are connected by a supply line or intake manifold 29 with a fresh fuel charge forming device such as the carburetor 30. Such device will receive a supply of gasoline or other fuel from a suitable source and vaporize the same with air in proportions such as to provide an air fuel ratio which when exploded in the primary cylinders will leave substantial quantities of combustible materials, methane, hydrogen and carbon monoxide, in the residual gases. The fuel charge will be distributed to the various primary cylinders 21a–24a through the intake manifold, admission to the respective cylinders being regulated by conventional valve-control intake ports such as 31a. An exhaust manifold 32 for the various primary cylinders is provided, the discharge of gases following explosion in the cylinders being regulated as conventionally by valve-control exhaust ports such as 33a.

The fresh fuel charge intake manifold 29 does not supply the secondary cylinders 25b–28b, but on the other hand a separate intake manifold 34 is provided for the secondary cylinders. As will be evident from Figs. 1 and 3 such intake manifold forms a continuation of and is in operative communication with the exhaust manifold 32 of the primary cylinders. With such arrangement the exhaust gases from the various primary cylinders will be collected in the manifold 32 and thereafter conducted to manifold 34 for admission selectively and at the proper time into the various secondary cylinders under regulation of valve control intake ports 35b. The discharge of exhaust gases from the secondary cylinders 25b–28b is regulated by valve control exhaust ports 36b and the gases are conducted away by an exhaust manifold 37 and the exhaust line 38.

All of the primary cylinders will be provided with charge-igniting means such as the spark plugs 39, and it is deemed preferable also to provide the secondary cylinders with similar firing means, although in the latter instance it may under some conditions be found that the exhaust gases may be ignited and exploded in the secondary cylinders with spontaneous combustion after they have been compressed therein. Each of the cylinders, both primary and secondary, will at the appropriate time draw in a charge upon the downward stroke of its piston as the valve control intake port (31a and 35b) is opened through a cam on the cam shaft 40 which is driven by the crank shaft 41 as through gears 42 and 43 (see Fig. 2). The charge will then be compressed and the igniting means will then operate to fire the charge and produce a downward explosive stroke of the piston and impart a power impulse to the crank shaft. On the next upward stroke of the piston the expended charge will pass out into the appropriate manifold (32 or 37). The exhaust gases from the secondary cylinders will either pass out into the atmosphere through the exhaust line 38 or be put to some desired use, while the exhaust gases from the primary cylinders passing into the manifold 32 will be treated to put the combustible constituents present therein in condition for re-explosion in the secondary cylinders.

To provide an explosive charge for the secondary cylinders the exhaust gases, or products of combustion from the primary cylinders, are supplemented by air in proportions such as to support explosion of the combustible constituents in the gases. As pointed out, the quantity of air necessary will be determined by the quantity of combustibles present, and this in turn is dependent upon the air fuel ratio of the original fuel charge exploded in the primary cylinders as regulated in the charge forming device 30. Air is therefore supplied to and admixed with the exhaust gases prior to their introduction into the various secondary cylinders. The formation of the new charge may be conveniently effected by interposing in the manifold line 32—34 a chamber 44. The air supply may be introduced into such a chamber in any convenient way, it being pointed out in this connection that relatively little pressure is developed in the manifolds by reason of the fact that the secondary cylinders 25b–28b withdraw the gases from the manifold line as fast as they are produced and discharged from the primary cylinders 21a–24a. As one convenient way of supplying air to the exhaust gases I have shown an air line 45 communicating with the mixing chamber 34. An air pump 46 may be utilized to force air through the line 45 and into the chamber, the pump being conveniently driven in any suitable manner as by means of a gear 47 meshing with teeth 48 on the fly wheel 49. The pump will have an air intake 50 which may be provided with a control valve 51 adapted to regulate to some degree the volume of air supplied to the exhaust gases. The speed of the air pump and the rate of supply of air thereby will vary directly as the rate of flow of exhaust gases under various conditions of engine speed by reason of its driving connection with the engine fly wheel. Depending on the quantities of combustible constituents in the exhaust gases as determined by the original fresh fuel charge air fuel ratio it appears necessary to supply roughly between 30% and 50% by volume of air in order to constitute with the exhaust gases an explosive charge.

It will be recognized that the function of the chamber 44 is that of a charge-forming device, its function with respect to the secondary cylinders being the same as the function of the carburetor 30 in connection with the primary cylinders—the admixture of air and combustible materials in proportions such as to provide an explosive mixture. In order to insure a thorough admixing of the air with the exhaust gases during transit to the secondary cylinders, the mixing chamber or charge-forming device 44 may be constructed as shown in Fig. 5, a series of baffles 52, 53, 54, and 55 being provided. Such baffles cause the exhaust gases to take a tortuous path which serves to some extent to reduce the temperature of the exhaust gases. The exhaust gases enter through the manifold 32 and during transit are mixed with the air coming in through the air line 45 and finally after being integrated with the air pass out as a combustible charge into the manifold 34 for distribution to the various secondary cylinders. In order to prevent spontaneous combustion and to insure the absence of flame in the exhaust gases prior to admixture with the air it may be found desirable to provide a flame trap or screen. Such device may be located at any convenient point between the secondary cylinders and the air supply line 45. In Fig. 1 such means is provided in the form of a series of screens 56 in the outlet end of the primary exhaust manifold 32.

The mixing chamber for treating the exhaust gases may be constructed in other ways than that just described. For example, it may take the form of the device shown in Fig. 6 wherein a chamber 57 is provided having a longitudinal partition 58. The exhaust gases enter at 32, are admixed with air entering at 45 and pass out through 34. A series of flame screens 59 are interposed in the chamber adjacent the inlet end and a series of tubes 60 extend through the chamber around which the gases pass both before and after admixture with the air. The purpose of such tubes is in part to cause thorough integration of the air and exhaust gases. They are also desirably made hollow so as to permit the circulation of the air from the outside therethrough so as to somewhat reduce the temperature of the gases and guard against spontaneous combustion.

In order to promote explosion of the exhaust gas charge in the secondary cylinders when the engine is first started, and again to provide a kindler serving to promote explosion of the gases when a relatively lean fresh fuel mixture is supplied to and exploded in the primary cylinders, it is deemed advisable to provide an auxiliary source of fresh fuel for introduction at appropriate times in the secondary cylinders. To this end an auxiliary fuel line 61 may be provided connecting with a suitable source of fuel such as the carburetor 30 which supplies the primary cylinders. Such line is provided with a control valve 62 so that the same may be rendered operative or inoperative at will. Where the air pump 46 is utilized to supply air to the exhaust gases the fuel line 61 may connect with the pump intake 50 so that fuel will be drawn through the line from the carburetor and introduced through the supply line 45 to the exhaust gases in the mixing chamber 44. The air inlet control valve 51 may be partially or wholly closed when it is desired to admix fresh fuel with the exhaust gases. It will be understood, of course, that the supplying of fresh fuel to the secondary cylinders is effected only when conditions are such as to render it necessary to insure explosion therein.

In the event that it is found that the secondary cylinders 25b–28b of the engines shown in Figs. 1 and 3 are not able to handle the total volume of exhaust gases supplied from the primary cylinders as supplemented by air, several expedients may be resorted to in order to overcome the difficulty. The simplest expedient is the provision of a manually or automatically pressure controlled escape valve at some point along the supply line between the primary and secondary cylinders. In Figs. 1 and 5 I have shown such a valve, 63 in association with the mixing chamber 44.

The arrangement just described is, however, wasteful in that the total available energy present in all exhaust gases from the primary cylinders are not utilized by reason of the escape of a portion of the exhaust gases into the atmosphere. While involving some departure from conventional engine construction, this objection may be overcome by constructing the engine so that the secondary cylinders have a larger displacement than the primary cylinders. Such arrangement is illustrated in Fig. 4, the primary cylinders 71a–74a being bored to a smaller diameter than the secondary cylinders 75b–78b. In other respects the modified engine will be the same as that of Figs. 1 and 2 heretofore described.

As heretofore pointed out, both the primary and secondary cylinders will operate on the four-cycle principle to draw in their respective charges, compress, explode, and finally discharge the same. In a sense it may be said that the primary and secondary cylinders operate independently of each other in that there need be no predetermined order of firing of the various primary cylinders with reference to the various secondary cylinders by reason of the fact that all of the primary cylinders discharge their exhaust gases into a common manifold 32 and such gases admixed with air are distributed to the various secondary cylinders as required under control of the secondary valve controlled intake ports.

It will be evident that in the engine described an original fuel charge supplied by the carburetor 30 will be exploded in the primary cylinders and thereafter in the form of exhaust gases be introduced and exploded in the secondary engine cylinders. An original fuel charge therefore passes successively through several cylinders in each of which it produces an explosive power impulse on the crank shaft, thus performing double the amount of work that it accomplishes in conventional internal combustion engines and resulting in tremendous fuel economy.

It will now be appreciated that the invention is capable of ready application to existing engines merely by a relatively inexpensive re-arrangement of the exhaust and intake manifolds therefor together with suitable means for supplying air, and it is therefore evident that the invention has a wide application. Of course the various features of the invention may be incorporated in different types of engines than that illustrated and described and considerable modification and equivalency may be carried out without departing from the essential principles of construction herein set forth.

I am aware of course that it has heretofore been proposed to utilize the heat developed by exhaust gases from internal combustion engines in expansion cylinders. In such instances only the heat energy of the exhaust gases is utilized and the power developed therein is far less than that obtained according to the present invention wherein the exhaust gases are formed into a new charge and exploded in combustion cylinders in the same manner as a fresh fuel charge is operated upon.

The present application is a continuation in part of my prior application Serial No. 413,837, filed December 13th, 1929. All of the basic features in the present application are disclosed in the previous case, but I have now introduced certain collateral features and improvements adapted to increase the utility and efficiency of the basic construction.

I claim:

1. In an internal combustion engine, a plurality of combustion cylinders, means for carbureting fresh liquid fuel and air to provide a preformed explosive fuel charge, means for supplying said charge in explosive condition to various of the engine cylinders constituting a primary group, means for selectively admitting, compressing and exploding the charge in the various cylinders of said group, and means for discharging the exhaust gases from the cylinders following explosion, in combination with means receiving said discharged exhaust gases and forming therefrom a distinct new charge including means supplying a regulated quantity of air to provide a mixture wherein the combustibles in the gases and the air are in a ratio to render the new charge capable of explosion, means for selectively admitting, compressing and firing the new mixture in other of said plurality of cylinders constituting a second group, and means for discharging the exhaust gases from the cylinders of the second group following explosion.

2. In an internal combustion engine, a plurality of combustion cylinders each adapted to receive, compress and explode a combustible charge and discharge the exhaust gases after explosion, valve-controlled intake and exhaust ports in each cylinder, a source of fuel and an intake manifold connecting with intake ports of certain of the cylinders in communication with the source of fuel, an exhaust manifold connecting with the exhaust ports of said same cylinders, independent intake and exhaust manifolds connecting with the valve-controlled intake and exhaust ports of the other combustion cylinders, and a charge forming chamber having a source of air supply connecting therewith interconnecting the exhaust manifold of said certain cylinders and the intake manifold of said other cylinders adapted to supply said other cylinders with a combustible charge formed of exhaust gases and air under control of the valves controlling the intake ports of said other cylinders.

3. In an internal combustion engine, a plurality of combustion cylinders each adapted to receive, compress and explode a combustible charge and discharge the exhaust gases after explosion, valve-controlled intake and exhaust ports in each cylinder, a source of fuel and an intake manifold connecting with intake ports of certain of the cylinders in communication with the source of fuel, an exhaust manifold connecting with the exhaust ports of said same cylinders, independent intake and exhaust manifolds connecting with the valve-controlled intake and exhaust ports of the other combustion cylinders, a charge forming chamber having a source of air supply connecting therewith interconnecting the exhaust manifold of said certain cylinders and the intake manifold of said other cylinders adapted to supply said other cylinders with a combustible charge formed of exhaust gases and air under control of the valves controlling the intake ports of said other cylinders, and flame extinguishing means through which the exhaust gases pass prior to admixture with the air.

4. In an internal combustion engine, a plurality of combustion cylinders each having valve-controlled intake and exhaust ports and operating to receive, compress, explode and discharge combustible charges, an intake manifold connecting with the intake ports of one group of said cylinders, a fuel charge device supplying a charge of fresh fuel to said group of cylinders through said intake manifold, gas conducting means connecting with said group of cylinders through the exhaust ports therein and also with the intake ports of a second group of the engine cylinders and adapted to conduct the exhaust gases from the first mentioned group of cylinders to the second group of cylinders, charge forming means including a source of air in the gas conducting means to form the exhaust gases during transit into a new combustible charge for explosion in the second group of cylinders, the discharge of exhaust gases from the cylinders of the first mentioned group and the intake of the new charge by the cylinders of the second group being regulated by the exhaust and intake valves.

5. In an internal combustion engine, a plurality of combustion cylinders each having valve-controlled intake and exhaust ports and operating to receive, compress, explode and discharge combustible charges, an intake manifold connecting with the intake ports of a first group of said cylinders, a fuel charge device supplying a charge of fresh fuel to said group of cylinders through said intake manifold, gas conducting means connecting with the first group of cylinders through the exhaust ports therein and also with the intake ports of a second group of the engine cylinders and adapted to conduct the exhaust gases from the first group of cylinders to the second group of cylinders, means for extinguishing any flame present in the exhaust gases during passage from one to the other group of cylinders, means including a source of air in the gas conducting means to form the exhaust gases after extinction of any flame into a new combustible charge for introduction and explosion in the second group of cylinders, the discharge of exhaust gases from the cylinders of the first group and the intake of the new charge by the cylinders of the second group being regulated by the exhaust and intake valves.

6. In an internal combustion engine, a plurality of combustion cylinders each having valve-controlled intake and exhaust ports and operating to receive, compress, explode and discharge combustible charges, an intake manifold connecting with the intake ports of a first group of said cylinders, a fuel charge device supplying a charge of fresh fuel to said group of cylinders through said intake manifold, gas conducting means connecting with the first group of cylinders through the exhaust ports therein and also with the intake ports of a second group of the engine cylinders and adapted to conduct the exhaust gases from the first group of cylinders to the second group of cylinders, charge forming means including an arangement for supplying air to the gas conducting means to form the exhaust gases into a new combustible charge for introduction to and explosion in the second group of cylinders, means for reducing the temperature of the exhaust gases and destroying any flame present prior to the point of admixture of the gases with the air, the discharge of exhaust gases from the cylinders of the first group and the intake of the new charge by the cylinders of the second group being regulated by the exhaust and intake valves.

7. In an internal combustion engine, a plurality of combustion cylinders each having valve-controlled intake and exhaust ports and operating to receive, compress, explode and discharge combustible charges, an intake manifold connecting with the intake ports of a first group of said cylinders, a fuel charge device supplying a charge of fresh fuel to said group of cylinders through said intake manifold, gas conducting means connecting with the first group of cylinders through the exhaust ports therein and also with the intake ports of a second group of the engine cylinders and adapted to conduct the exhaust gases from the first group of cylinders to the second group of cylinders, charge forming means intermediate the several groups of cylinders including an arrangement for supplying air to the gas conducting means to form the exhaust gases into a new independent combustible charge for introduction to and explosion in the second group of cylinders, the discharge of exhaust gases from the cylinders of the first group and the intake of the new charge by the cylinders of the second group being regulated by the exhaust and intake valves, and valve-controlled fresh fuel auxiliary supply means for the second group of cylinders communicating with the gas conducting means.

8. In an internal combustion engine, a plurality of combustion cylinders each having valve-controlled intake and exhaust ports and operating to receive, compress, explode and discharge combustible charges, an intake manifold connecting with the intake ports of a first group of said cylinders, a fuel charge device supplying fresh fuel charges to said group of cylinders through said intake manifold, gas conducting means connecting with the first group of cylinders through the exhaust ports therein and also with the intake ports of a second group of the engine cylinders and adapted to conduct the exhaust gases from the first group of cylinders to the second group of cylinders, means including an arrangement for supplying air to the gas conducting means to form the exhaust gases into a new combustible charge for introduction to and explosion in the second group of cylinders, the discharge of exhaust gases from the cylinders of the first group and the intake of the new charge by the cylinders of the second group being regulated by the exhaust and intake valves, the combustion cylinders which utilize the exhaust gas-air charge being of greater displacement than the cylinders utilizing fresh fuel.

9. In an internal combustion engine, a plurality of combustion cylinders each having valve-controlled intake and exhaust ports and operating to receive, compress, explode and discharge combustible charges, an intake manifold connecting with the intake ports of a first group of said cylinders, a fuel charge device supplying fresh fuel charges to said group of cylinders through said intake manifold, gas conducting means connecting with the first group of cylinders through the exhaust ports therein and also with the intake ports of a second group of the engine cylinders and adapted to conduct the exhaust gases from the first group of cylinders to the second group of cylinders, means including an air pump connecting with the gas conducting means to form the exhaust gases into a new combustible charge for introduction to and explosion in the second group of cylinders, the discharge of exhaust gases from the cylinders of the first group and the intake of the new charge by the cylinders of the second group being regulated by the exhaust and intake valves.

10. In an internal combustion engine, a plurality of combustion cylinders each having valve-controlled intake and exhaust ports and operating to receive, compress, explode and discharge combustible charges, an intake manifold connecting with the intake ports of a first group of said cylinders, a fuel charge device supplying said group of cylinders through said intake manifold, gas conducting means connecting with the first group of cylinders through the exhaust ports therein and also with the intake ports of a second group of the engine cylinders and adapted to conduct the exhaust gases from the first group of cylinders to the second group of cylinders, a baffled mixing chamber in the gas conducting means intermediate the exhaust ports of the first group of cylinders and the intake ports of the second group of cylinders having a source of air connecting therewith and adapted to mix the exhaust gases with air to form a new combustible charge for explosion in the second group of cylinders, the discharge of exhaust gases from the cylinders of the first group and the intake of the new charge by the cylinders of the second group being regulated by the exhaust and intake valves.

11. In an internal combustion engine, a plurality of combustion cylinders each having valve-controlled intake and exhaust ports and operating to receive, compress, explode and discharge combustible charges, an intake manifold connecting with the intake ports of a first group of said cylinders, a fuel charge device supplying said group of cylinders through said intake manifold, gas conducting means connecting with the first group of cylinders through the exhaust ports therein and also with the intake ports of a second group of the engine cylinders and adapted to conduct the exhaust gases from the first group of cylinders to the second group of cylinders, a baffled mixing chamber in the gas conducting means intermediate the exhaust ports of the first group of cylinders and the intake ports of the second group of cylinders having a source of air connecting therewith and adapted to mix the exhaust gases with air to form a new combustible charge for explosion in the second group of cylinders, and means for extinguishing any flame present in the exhaust gases prior to the addition of air in the mixing chamber, the discharge of exhaust gases from the cylinders of the first group and the intake of the new charge by the cylinders of the second group be- 12. In an internal combustion engine a group of primary combustion cylinders having firing means and valve-controlled intake and exhaust ports and operating to receive, compress, explode and discharge a fuel charge, a group of secondary combustion cylinders having intake and exhaust ports, a fuel charge forming device, an intake manifold connecting with the fuel charge forming device and supplying the primary cylinders with fuel through the intake ports therein, an exhaust manifold connecting with the exhaust ports of the primary cylinders, a separate intake manifold for the secondary cylinders communicating with the exhaust manifold of the primary cylinders and adapted to supply the exhaust gases to the secondary cylinders, means for lowering the temperature of the exhaust gases and eliminating any flame therein, means for admixing the exhaust gases with air to form an explosive mixture for the secondary cylinders, the secondary cylinders having firing means and valves controlling their intake and exhaust ports and operating to receive, compress, explode and then discharge the exhaust gas mixture in the same manner as the primary cylinders operate upon the fresh fuel charge.

13. In an internal combustion engine, a plurality of combustion cylinders arranged in line and having pistons working through a common crankshaft, each of said cylinders having charge-firing means and valve-controlled intake and exhaust ports, an intake manifold communicating with the intake ports of certain of said cylinders defining a group, a separate intake manifold communicating with the intake ports of other engine cylinders defining another group, separate exhaust manifolds communicating with the exhaust ports of the several groups of cylinders, a charge forming device communicating with the intake manifold of one group of cylinders and supplying said group of cylinders with fresh fuel charges for compression and explosion therein, the intake manifold for the other group of cylinders connecting with the exhaust manifold of said one group, means for admixing air with the exhaust gases from said one group of cylinders to form the same into a combustible charge prior to their passage into the other group of cylinders, the valved intake ports permitting the introduction of the new mixture into the cylinders of the other group at any desired intervals for compression and explosion therein.

14. In an internal combustion engine, a plurality of four-cycle combustion cylinders, means for supplying a combustible fresh fuel charge to one group of said cylinders as the operating charge therefor, means for firing the charge therein, a charge forming device having an intake receiving from said cylinder group the gaseous products of combustion of said fresh fuel charge and including means for admixing air with said products in said device to form therefrom a distinct new explosive charge, a conduit receiving the gaseous charge formed in said charge forming device and supplying the same to another cylinder group as the operating charge therefor, and means for firing said gaseous charge in said other cylinder group.

15. In an internal combustion engine, a plurality of four-cycle combustion cylinders comprising a primary group and a secondary group, a charge forming device supplying an explosive fresh fuel charge to the primary cylinder group, a separate charge forming device for the secondary cylinder group receiving from the primary group the products of combustion of the fresh fuel charge and forming the same into a gaseous explosive charge with air, together with means for supplying the gaseous charge as the operating charge to the secondary cylinder group, and means for firing the respective charges in the primary and secondary cylinders.

16. In an internal combustion engine, a plurality of four cycle combustion cylinders, means for supplying a combustible fresh fuel charge to one group of said cylinders as the operating charge therefor, means for firing the charge therein, a charge forming device receiving the gaseous products of combustion discharged from the cylinder group utilizing said fresh fuel charge, said charge forming device serving to supply and mix with said products of combustion a regulated quantity of air proportioned with relation to the combustible portions of said gaseous products so as to form a gaseous explosive charge, and a conduit connecting with said charge forming device and serving to supply the charge developed as the operating charge to another group of said cylinders, and means for firing said gaseous charge in said latter cylinder group.

17. In an internal combustion engine a plurality of explosion chambers, means for admixing fresh vaporizable fuel and air to produce an explosive mixture, means for periodically admitting portions of said explosive mixture into certain of said chambers, means for exploding said portions of said mixture in said chambers, means responsive to the resulting explosions and propelled thereby to convert the explosive impulses into mechanical power, means for bringing about the withdrawal from said chambers of the gases resulting from said explosions, means including air inlet means for reforming said gases into a separate, new, non-flaming explosive mixture, means for periodically admitting portions of said new explosive mixture into certain of said chambers, the arrangement being such that the exhaust gases taken from one chamber will be introduced into a different chamber, means for exploding said portions of the new explosive mixture in said chambers, and means responsive to the resulting explosions and propelled thereby to convert the explosive impulses into additional mechanical power.

18. In an internal combustion engine a plurality of explosion chambers, means for admixing fresh vaporizable fuel and air to produce an explosive mixture, means for periodically admitting portions of said explosive mixture into certain of said chambers, means for exploding said portions of said mixture in said chambers, means responsive to the resulting explosions and propelled thereby to convert the explosive impulses into mechanical power, means for bringing about the withdrawal from said chambers of the gases resulting from said explosions, means including air and fresh fuel inlet means for reforming said gases into a separate, new, non-flaming explosive mixture, means for periodically admitting portions of said new explosive mixture into certain of said chambers, the arrangement being such that the exhaust gases taken from one chamber will be introduced into a different chamber, means for exploding said portions of the new explosive mixture in said chambers, and means responsive to the resulting explosions and propelled thereby to convert the explosive impulses into additional mechanical power.

19. In an internal combustion engine, a plurality of combustion cylinders each having valve-controlled intake and exhaust ports and operating to receive, compress, explode and discharge combustible charges, an intake manifold connecting with the intake ports of a first group of said cylinders, a fuel charge device supplying fresh fuel charges to said group of cylinders through said intake manifold, gas conducting means connecting with the first group of cylinders through the exhaust ports therein and also with the intake ports of a second group of the engine cylinders and adapted to conduct the exhaust gases from the first group of cylinders to the second group of cylinders, means including an arrangement for supplying air in the gas conducting means to form the exhaust gases into a new combustible charge for introduction to and explosion in the second group of cylinders, the discharge of exhaust gases from the cylinders of the first group and the intake of the new charge by the cylinders of the second group being regulated by the exhaust and intake valves, and means for introducing an auxiliary supply of fresh fuel into the new charge prior to explosion in the second group of cylinders, the second group of cylinders being of greater displacement than the first group of cylinders.

20. An internal combustion engine comprising a plurality of four cycle firing cylinders, a carburetor adapted to form an explosive charge of fresh liquid fuel, an intake manifold connecting with said carburetor and distributing the charge formed thereby to a first group of the engine cylinders as the operating charge therefor, an exhaust manifold for said first group of cylinders having an extension connecting with and constituting the intake manifold for a second different group of the engine cylinders, a charge forming device including an air intake interposed in said common manifold between the exhaust ports of the cylinders of the first group and the inlet ports of the cylinders of the second group and being adapted to supply and admix with the exhaust gases received from the cylinders of the first group a proportioned amount of air to supplement the air-fuel ratio of the original charge, which determines the composition of the exhaust gases, and providing a new explosive charge for distribution by the manifold to the cylinders of the second group as the operating charge therefor, and a separate exhaust manifold for the second group of cylinders.

21. An internal combustion engine comprising a plurality of four cycle firing cylinders, a carburetor adapted to form an explosive charge of fresh liquid fuel, an intake manifold connecting with said carburetor and distributing the charge formed thereby to a first group of the engine cylinders as the operating charge therefor, an exhaust manifold connecting with said first group of cylinders for collecting the exhaust gases discharged therefrom, charge forming means for admixing air with said exhaust gases from the fresh fuel cylinders to form therefrom a new explosive gaseous charge, and means for controlling the proportioning of said new charge ingredients in accordance with the air-fuel ratio of the fresh fuel charge which determines the composition and combustibility of the exhaust gases, a separate intake manifold connecting with a second cylinder group comprising other cylinders of the engine for distributing the new gaseous charge thereto as the explosive operating charge, and a separate exhaust manifold for said second group of cylinders.

22. In combination, a first group of four cycle firing engine cylinders, a carburetor adapted to form an explosive charge of fresh liquid fuel, an intake manifold distributing said fresh fuel charge to said group of cylinders as the operating charge therefor, an exhaust manifold collecting the exhaust gases discharged from said cylinders, a second group of four cycle firing engine cylinders, an intake manifold for conducting the exhaust gases from the exhaut manifold of the cylinders of the first group to the second group of cylinders, and charge forming means for proportioning and mixing said exhaust gases during transit to the second group of cylinders with air in controlled proportions in accordance with the air-fuel ratio of the original fresh fuel charge and providing a new explosive gaseous mixture as the operating charge for said second group of cylinders, and a separate exhaust manifold receiving the discharge from the second group of cylinders.

23. An internal combustion engine comprising a first group of four cycle firing cylinders operating by the explosion of a fresh liquid fuel charge and a second group of other four cycle firing cylinders operating by the explosion of an explosive gaseous charge developed from the exhaust gases of the first cylinder group, and including separate intake manifolds and separate exhaust manifolds for the different groups of cylinders, a carburetor adapted to supply a fresh liquid fuel charge connecting with one of the intake manifolds to supply the operating charge to the cylinders of said first group for explosion therein, and charge forming means including an air pump supplying a variable amount of air under variations in engine speed for proportioning and mixing air and the exhaust gases from said first group of cylinders to provide a new explosive gaseous charge, said charge forming means interconnecting the exhaust manifold of said first group of cylinders and the intake manifold of the other group of cylinders and supplying the explosive charge for the latter group of cylinders.

NATHANIEL P. PRATT.